United States Patent
Matsuo

[19]
[11] Patent Number: 5,951,281
[45] Date of Patent: Sep. 14, 1999

[54] GAS FLOW CIRCULATION TYPE TUBULAR HEATING EQUIPMENT

[75] Inventor: Mamoru Matsuo, Yokohama, Japan

[73] Assignee: Nippon Furnace Kogyo Kabushiki Kaisha, Kanagawa, Japan

[21] Appl. No.: 09/091,785

[22] PCT Filed: Dec. 27, 1996

[86] PCT No.: PCT/JP96/03886

§ 371 Date: Jun. 24, 1998

§ 102(e) Date: Jun. 24, 1998

[87] PCT Pub. No.: WO97/24554

PCT Pub. Date: Jul. 10, 1997

[30]     Foreign Application Priority Data

Dec. 28, 1995   [JP]   Japan .................................... 7-343391

[51] Int. Cl.⁶ ....................................................... F27D 7/04
[52] U.S. Cl. ........................... 432/199; 432/152; 432/176
[58] Field of Search .................................. 432/8, 59, 72, 432/152, 176, 179, 180, 199

[56]            References Cited

U.S. PATENT DOCUMENTS

| | | | |
|---|---|---|---|
| 3,581,679 | 6/1971 | Jansen et al. | 432/199 |
| 4,384,850 | 5/1983 | Dixon | 432/72 |
| 4,457,493 | 7/1984 | Takahashi | 432/199 |

FOREIGN PATENT DOCUMENTS 61-106721   5/1986   Japan .

*Primary Examiner*—Teresa Walberg
*Assistant Examiner*—Gregory A. Wilson
*Attorney, Agent, or Firm*—Notaro & Michalos P.C.

[57]              ABSTRACT

The present invention relates to a gas recirculating tubular heating equipment which improves the heat transfer performance, reduces a heat transfer area to approximately ½ or under of that of a prior art and is not limited to a certain type of available fuel. This equipment comprises: a furnace 1 having a plurality of tubes 19; heating chambers 2 provided with heat sources 3A and 3B for heating a recirculating gas current outside the furnace; and an out-of-furnace circulating path 4 for taking out a part of the recirculating gas current passing through the inside of the furnace 18 to the outside of the furnace and flowing it back from another position to the inside of the furnace 18. The out-of-furnace circulating path 4 is provided with: regenerative beds 5A and 5B at outlet and inlet openings 9A and 9B communicating with the heating chambers 2; a circulating fan 6; a passage switching device 7 for selectively and alternately connecting an intake opening side and a discharge opening side of the circulating fan 6 with one of the regenerative beds 5A and 5B to switch a direction of the gas current flowing to the regenerative beds 5A and 5B; and a heat removing means 8 for performing heat removal or dilution in the both regenerative beds 5A and 5B, in order that inside the furnace 18 is formed a high-temperature strong recirculating current 10 for periodically inverting a direction of the gas current by the passage switching device 7.

6 Claims, 5 Drawing Sheets

GAS FLOW CIRCULATION TYPE TUBULAR HEATING EQUIPMENT

FIELD OF THE INVENTION

The present invention relates to a tubular heating equipment, such as a boiler, a tubular furnace, a superheater or a hydrogen reformer, provided with a plurality of tubes for flowing a heating target into a furnace for heating the heating target fluid flowing through the tubes by convection heat transfer.

BACKGROUND OF THE INVENTION

As this type of heating equipment, there is known a gas recirculating type boiler such as shown in FIG. 6. This gas recirculating type boiler consists of only a convection heat transfer section and has a configuration such that a plurality of tubes 103 for flowing boiler water therethrough are arranged in a furnace 102 and a flame is jetted from a burner 104 provided on one furnace wall directly into the furnace 102 so as to be exhausted from an exhaust opening 109 on the opposed furnace wall. A small combustion space 108 is formed in front of the furnace wall having the burner 104 provided thereon in order to perform combustion and form a flame. When combustion gas weaves between the tubes 103 in the furnace 102, the boiler water in the tube 103 is heated by convection heat transfer. It is to be noted that reference numeral 101 denotes a furnace body; 105, a fuel nozzle; 106, a window box; and 107, a burner throat.

In the prior art gas current type boiler, however, since the combustion gas passes through the furnace 102 in one direction and is directly exhausted, a large difference in temperature of the gas current between the upstream and the downstream of the combustion gas produces an extreme difference in heat flux (heat transfer quantity per heat transfer area) between the tube on the upstream side and that on the downstream side. Therefore, although the average heat flux relative to the heat transfer surface of the entire furnace is reduced and a large heat transfer area is required, an exhaust temperature is high and the thermal efficiency is low. An exhaust temperature must be lowered as possible in order to increase the thermal efficiency. In this case, however, a logarithmic mean temperature difference between the gas current and the tube is decreased as the exhaust temperature becomes lower. Therefore, the more the thermal efficiency is increased by lowering the exhaust temperature, the larger the necessary heat transfer area is required, thereby increasing the size of the furnace.

Further, since the combustion space in the furnace is zero or small if it exists and the flame is immediately cooled down by the water pipe, carbon monoxide (CO) is apt to be generated and the only available fuel is gas fuel, resulting in such a problem as that liquid fuel can not be used.

DISCLOSURE OF THE INVENTION

It is, therefore, an object of the present invention to provide a gas recirculating tubular heating equipment having an excellent heat transfer performance. It is another object of the present invention to provide a gas recirculating tubular heating equipment being capable of assuring a large quantity of high-temperature circulating current with low power. It is still another object of the present invention to provide a gas recirculating tubular heating equipment being capable of forming a gas current having a high and uniform temperature in all the area in the furnace.

To this end, the present invention provides an equipment for passing a high-temperature gas current in a furnace having therein a group of tubes for passing a heating target fluid therethrough for heating the heating target flowing through the tubes, the equipment comprising: heating chambers each provided on both side walls of the furnace and having a heating source for heating a gas current which is yet to be injected into the furnace; and an out-of-furnace circulating path for connecting these heating chambers to take out a recirculating gas current in the furnace to the outside of the furnace and flow it back into the furnace. The out-of-furnace circulating path includes: regenerative beds provided to an output opening and a return opening close to the heating chambers, respectively; a circulating fan; a passage switching device for selectively and alternately connecting an inlet side and an outlet side of the circulating fan to one of the regenerative beds to switch a flow direction of a gas current to the regenerative beds; and a heat removing means for performing heat removal or dilution in order to change the gaseity of the recirculating gas current in a section between the both regenerative beds, thereby forming in the furnace a high-temperature strong recirculating current for periodically inverting a flow direction of the gas current by the cyclic changeover operation of the passage switching device.

In this case, the gas current having passed through the furnace and used for heating the heating target is partially taken out to the out-of-furnace circulating path by a negative pressure generated by the circulating fan and again injected into the furnace at high speed after increasing its pressure by the circulating fan. This forms a recirculating gas current (referred to as a strong recirculating current in this specification) having a volume much larger than that of the supplied gas current in the furnace. In this process, the recirculating gas current comes to have a low temperature when its sensible heat is taken by the regenerative bed on the intake side of the out-of-furnace circulating path. The recirculating gas current which has cooled down has the pressure increased by the circulating fan and thereafter passes through the regenerative bed on the opposite side where the recirculating gas current again comes to have a high temperature by direct heat exchange, thereby being injected into the furnace. Therefore, the low-temperature circulating fan can be used to form the high-temperature strong recirculating gas current in the furnace. That is, since reduction in temperature of the recirculating gas current can enlarge the size of the circulating fan (improve the ability), increasing a quantity of discharge flow to enable generation of the strong recirculating current. In convection heat transfer, since a velocity of the gas current controls the heat transfer, the high-temperature strong recirculating current having a high velocity can greatly increase the recirculating quantity of the gas current in the wide area of the heating space in the furnace more than the prior art, and an increase in the heat transfer efficiency can lead to an augment in the quantity of heat transfer. Further, according to the present invention, a direction of the gas current is periodically inverted, and hence uniformalization of the temperature in the furnace reduces a difference in temperature of the gas current in the furnace, which leads to reduction in unevenness of heating and an increase in the gas current temperature to an allowable heat flux. Accordingly, the size of the furnace or the heating process time can be decreased by reducing the heat transfer area and, for example, when the heating process time is the same, the heat transfer area can be reduced to ½ through ⅓ of that in the prior art, thereby reducing the size of the facility. Also, uniformalizing the temperature in the furnace can minimize the heat stress against the furnace structure.

Moreover, according to the gas recirculating tubular heating equipment of the present invention, since the sufficient combustion space can be obtained before the gas current reaches the inside of the furnace and the flame can not be immediately cooled down by being brought into contact with the tube, the available fuel is not restricted to the fuel gas and the liquid type fuel can be also used.

On the other hand, in the out-of-furnace circulating path, the gaseity of the recirculating gas current is changed by heat removal or dilution by the heat removing means to prevent the balanced temperature from increasing. Here, the balanced temperature and the temperature at the return opening obtained by removing heat of the recirculating gas current can be represented by the following expression (1).

Balanced Temperature Obtained by Removing Heat from the Recirculating Gas Current $$t_c = t_h - \frac{\Delta t}{1 - \eta_t} \quad (1)$$

$$t_1 = (1 - \eta_t)t_c + \eta_t t_h$$

$t_c$: balanced temperature ° C.

$t_h$: temperature of recirculating gas current (at output opening) ° C.

$t_1$: temperature of recirculating gas current (at return opening) ° C.

$\Delta t$: difference in temperature obtained by removing heat of recirculating gas current ° C. $\eta_t$: temperature efficiency of regenerator The balanced temperature $t_c$ of the gas current at an inlet opening of the circulating fan is controlled by a difference in temperature $\Delta t$ obtained by removing heat of the recirculating gas current and the temperature efficiency of the regenerative bed and, for example, when the temperature $t_h$ of the recirculating gas current at the output opening is 1000° C., the relationship shown in FIG. 2 is established. In addition, a balanced temperature and a temperature at the return opening obtained by diluting the recirculating gas current are represented by the following expression 2.

Balanced Temperature Obtained by Diluting the Recirculating Gas Current $$t_c = \frac{t_h - \left(1 + \frac{\Delta G}{G}\right)\eta_t t_h + \frac{\Delta G}{G} t_o}{\left(1 + \frac{\Delta G}{G}\right)(1 - \eta_t)} \quad (2)$$

$$t_1 = (1 - \eta_t)t_c + \eta_t t_h$$

$t_c$: balanced temperature ° C.

$t_h$: temperature of recirculating gas current (at output opening) ° C.

$t_1$: temperature of recirculating gas current (at return opening) ° C.

$t_o$: ambient temperatures ° C.

$\Delta G$: quantity of diluted air $Nm^3/h$ $G$: quantity of recirculating gas current $Nm^3/h$ $\eta_t$: temperature efficiency of regenerator The balanced temperature $t_c$ of the gas current at an inlet opening of the circulating fan is controlled by the quantity of the diluted air $\Delta G$ to the recirculating gas current and the temperature efficiency of the regenerative bed and, for example, when the temperature $t_h$ of the recirculating gas current at the output opening is 1000° C. and the ambient temperature $t_o$ is 20° C., the relationship shown in FIG. 3 is established. Therefore, the gaseity can be changed by removing appropriate quantity of heat or diluting the appropriate quantity of air in the out-of-furnace circulating path to prevent the balanced temperature from increasing.

Here, although the above-mentioned heat removing means is not restricted to be set at a given position as long as it is provided between the regenerative beds set at the recirculating gas current intake and outlet openings in the vicinity of the heating chambers of the out-of-furnace circulating path, it may preferably placed between the passage switching means and the intake side of the circulating fan. In such a case, the recirculating gas current flowing into the circulating fan comes to have a further lower temperature, which reduces damages to the circulating fan and increases the quantity of the discharge current. Additionally, the heat removing means is constituted by injecting a small quantity of gas for dilution such as air or exhaust gas into the recirculating gas current, using a preheater for preheating a heating target fluid such as boiler water or petroleum, or by reducing the heat retaining effect of the passage between the both regenerative beds, e.g., reducing the thickness of the heat insulator or using the heat insulator having a poor heat retaining property.

Moreover, various kinds of burner, radiant tube burner, electric heater can be used as a heat source in the gas recirculating tubular heating equipment according to the present invention, and it is preferable to employ a burner, particularly a regenerative burner system which is provided with regenerative beds and alternately burn a pair of burners that supply combustion air or exhaust recirculating gas current through the regenerative beds. In this case, when partially exhausting the recirculating gas, since the recirculating gas is again used for preheating the combustion air with the extremely high thermal efficiency and returned to the furnace after its sensible heat is recovered in the regenerative bed, the heat of the recirculating gas current can be recovered so that this gas current be cooled down to have a low temperature which does not give the adverse influence on the environment and then exhausted even though a temperature of the recirculating gas current is increased, thereby maintaining the high thermal efficiency. Thus, according to the present invention, when the quantity of heat transfer is increased and the throughput and the processing time are the same, the heat transfer area and the size of the furnace can be reduced because the average temperature of the gas current in the furnace can be higher. Further, there is formed the heat circulation in which substantially all of the heat of the combustion exhaust gas turns into the high-temperature preheated air and is returned to the inside of the furnace, and hence the high-temperature strong recirculating current can be formed with the reduced quantity of combustion, saving the energy.

BEST MODE FOR EMBODYING THE INVENTION

The structure of the present invention will now be described in detail in conjunction with an illustrative preferred embodiment.

Figure 1:
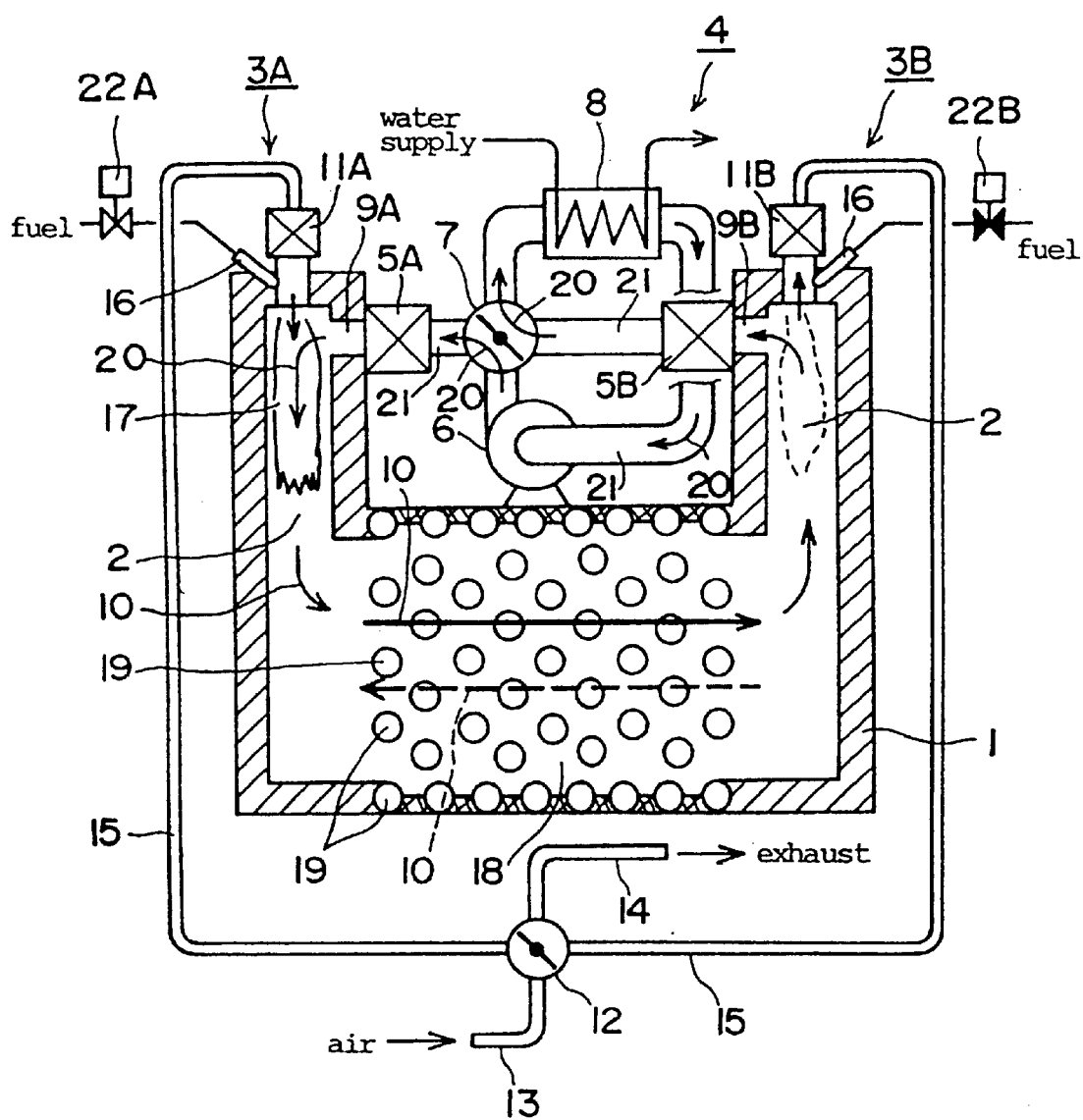
FIG. 1 is a principle view showing a preferred embodiment in which the present invention is applied to a gas recirculating tubular boiler.

FIG. 1 shows an embodiment in which the present invention is applied to a gas recirculating boiler. This gas recirculating boiler mainly consists of: a furnace 1 provided with a plurality of tubes 19 for flowing boiler water therethrough; heating chambers 2 connected with both side walls of the furnace 1; heat source burners 3A and 3B for heating recirculating gas current 20 in the heating chambers 2 for carburetion; and an out-of-furnace circulating path 4 for passing the high-temperature gas current whose heat has been increased through the inside of the furnace 18 to be taken into one heating chamber 2 on the opposed side and thereafter flowing it back into the other heating chamber 2 on an injection side. In the present embodiment, a regenerative burner system constituted by a pair of burners 3A and 3B for performing alternate combustion is adopted as the heat source burner. The out-of-furnace circulating path 4 is provided so as to form in the inner space of the furnace 18 a high-temperature strong recirculating current 10 for periodically inverting a direction of the gas current in accordance with switching of the burners 3A and 3B. Recirculation gas current outlet and inlet openings 9A and 9B of the out-of-furnace circulating path 4 are arranged on the upper portion of the heating chambers 2. The recirculating gas current injected from the out-of-furnace circulating path 4 is heated to have a predetermined temperature in the heating chambers 2 and thereafter blown into the inner space of the furnace 18. The recirculating gas current 20 passes through the both heating chambers 2 and out-of-furnace circulating path 4 to form the high-temperature strong recirculating current 10 passing through the inside of the furnace 18.

On the other hand, the regenerative burner system selectively connects the pair of burners 3A and 3B having regenerative beds 11A and 11B respectively with either an air supply system 13 or an exhaust system 14 through a passage switching means, e.g., a four-way valve 12 in order that one of burners 3A and 3B performs combustion while the recirculating gas current, having been used for heating a heating target, be exhausted from the other burner currently effecting no combustion. The burners 3A and 3B are fixed on tops of the heating chambers 2 provided on the both side walls of the furnace 1, respectively, and they alternately operate. It is to be noted that reference numeral 16 denotes a fuel nozzle.

The regenerative beds 11A and 11B are accommodated in burner bodies or different casings and incorporated in the burners 3A and 3B. The regenerative beds 11A and 11B carry out heat exchange with the exhaust gas passing therethrough to recover the wasted heat and preheat the combustion air by using the recovered heat. The regenerative beds 11A and 11B of the respective burners 3A and 3B are connected to two ports (two ports provided at positions where they do not communicate with each other) of four ports of the four-way valve 12 through ducts 15. Further, to the remaining two ports of the four-way valve 12 are connected the air supply system 13 and the exhaust system 14. Therefore, one of the burners 3A and 3B and one of the regenerative beds 11A and 11B are connected with the air supply system 13 and the remaining burner and regenerative bed are connected with the exhaust system 14. Their connection is switched by changing over the four-way valve 12 which synchronizes with the passage switching device 7 of the out-of-furnace circulating path 4.

On the other hand, the out-of-furnace circulating path 4 is made up of: regenerative beds 5A and 5B provided in the vicinity of recirculating gas current outlet and inlet openings 9A and 9B of the respective heating chambers 2; a circulating fan 6; a passage switching device 7 for switching a direction of a gas current flowing to the regenerative beds 5A and 5B by selectively and alternately connecting intake and outlet opening sides of the circulating fan 6 with one of the regenerative beds 5A and 5B; a heat removing means 8 for performing heat removal or dilution in order to change gaseity of the gas current; and a duct 21 for connecting these constituent parts with each other, removal and resupply of the combustion gas, having passed through the regenerative beds 5A and 5B, being alternately performed by periodically changing over the passage switching device 7 to form in the inner space of the furnace 18 the high-temperature strong recirculating current 10 for periodically inverting a direction of the gas current.

Here, it is preferable to use the structure and material whose pressure loss is relatively low but heat capacity is large and which have the improved durability, e.g., a ceramic cylindrical body which has a plurality of cells and a honey-comb shape for the regenerative beds 11A and 11B used in the heat source burners 3A and 3B and the regenerative beds 5A and 5B provided in the out-of-furnace circulating path 4. For example, a honey-comb-shaped member manufactured by extrusion-molding the ceramic material such as cordierite or mullite may be preferably used for heat exchange between a fluid having a temperature of approximately 1000° C. such as the combustion exhaust gas and a counterpart having a relatively-low temperature of approximately 20° C. such as the combustion air. Further, as a honey-comb-shaped regenerative bed, it may be possible to employ a material other than aluminum or ceramics, e.g., a metal such as a heat-resisting steel or a complex of ceramics and a metal, e.g., an $Al_2O_3$—Al complex or an SiC—$Al_2O_3$—Al complex whose pores are completely filled up. This type of complex can be manufactured by causing the melted metal to spontaneously penetrate into pores of the ceramics having a porous structure, oxidating or nitriding a part of that metal to turn into ceramics. It is to be noted that the honey-comb shape essentially indicates hexagonal cells (holes) but it includes the structure having square or triangular cells as well as hexagonal cells formed thereto in this specification. In addition, the honey-comb-shaped regenerative bed may be obtained by bundling tubes or the like without performing integral molding. However, the shapes of the regenerative beds 5A, 5B, 11A and 11B are not restricted to the honey-comb shapes, and flat-plate-type or corrugated-plate-type regenerative materials may be radially arranged in a cylindrical casing or pipe-like regenerative materials may be filled in a cylindrical casing in such a manner that the fluid can pass through the materials in the axial direction. Further, a cylindrical casing in which two chambers are formed by a partition wall in the circumferential direction and the fluid can pass in the axial direction may be prepared, and the regenerative bed may be constituted by filling a lump of the spherical, short-pipe-like, short-rod-like, small-piece-type, nugget-type or net-type regenerative material in each of the chambers.

Further, a boiler water preheater is provided between the intake side of the circulating fan 6 and the passage switching device 7 as a heat removing means 8. The preheater 8 flows the boiler water so as to effect heat removal suitable for the temperature efficiency of the regenerative beds 5A and 5B. In this case, the thermal efficiency of the overall facility can be further improved. A quantity of heat removal obtained by preheating the boiler water can be represented by the above expression 1.

Figure 2:
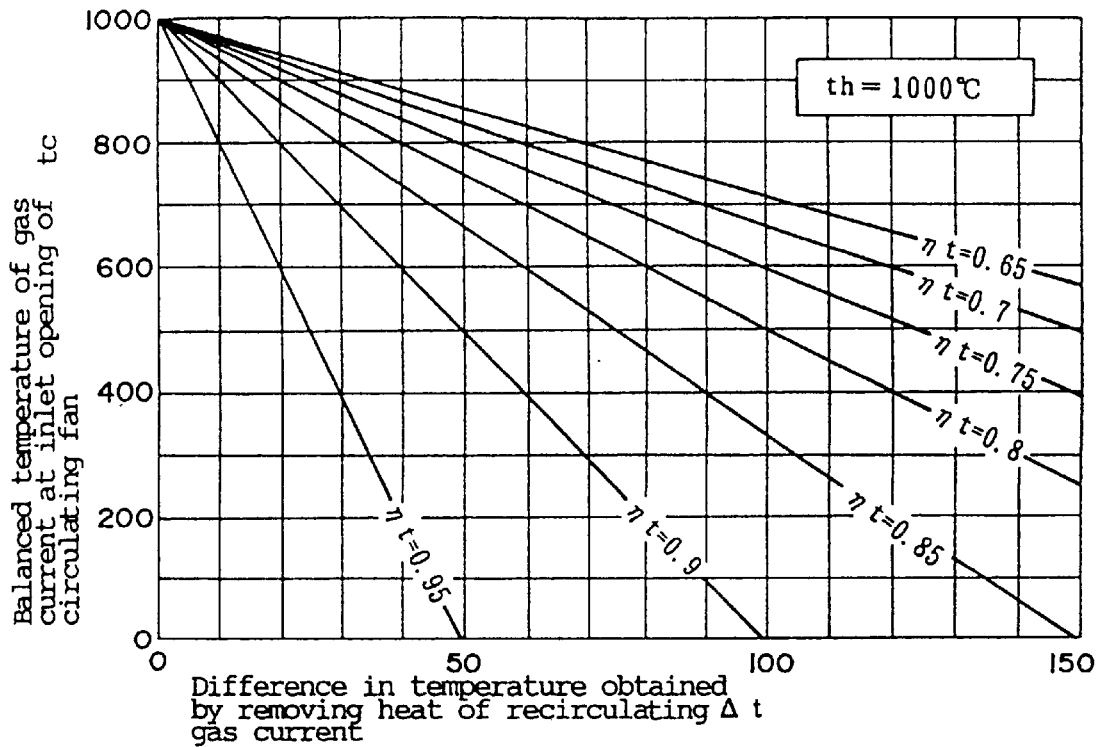
FIG. 2 is a graph showing the relationship between the balanced temperature of a gas current at an intake opening of a circulating fan and a difference in temperature obtained by removing heat of the recirculating gas current in connection with the relationship with the temperature efficiency of a regenerative bed.

The balanced temperature to of the gas current at the intake opening of the circulating fan is controlled by the heat removal temperature difference $\Delta t$ and the temperature efficiency of the regenerative bed and, for example, the relationship shown in FIG. 2 is established when the temperature at the gas current output opening th is 1000° C. As a countermeasure, the gaseity is changed by an appropriate quantity of heat removal in the out-of-furnace circulating path 4 in order to prevent the balanced temperature from increasing. When the temperature efficiency of the regenerative beds 5A and 5B is approximately 80 through 90%, the heat removal temperature difference $\Delta t$ is usually set within the range of 100 through 200° C.

According to the gas recirculating boiler having the above arrangement, an increase in the quantity of heat transfer can be realized in the following manner.

The pair of regenerative burners 3A and 3B constituting a heat source alternately burn and a flame 17 is formed in the heating chambers 2 to intend carburetion of the recirculating gas current 20 flowing toward the furnace. For example, when operating the burner 3A, the four-way valve 12 is changed over so as to connect the burner 3A with the combustion air supply system 13, and one fuel control valve 22A is opened while the other fuel control valve 22B is closed. As a result, the combustion air to be supplied passes through the regenerative bed 11A and is preheated to have a high temperature close to that of the exhaust gas, e.g., approximately 800 through 1000° C. Subsequently, this combustion air flows into each burner throat and is mixed with the fuel injected from each fuel nozzle 16 to perform combustion. Meanwhile, on the burner 3B connected to the exhaust system, the gas having passed through the inside of the furnace 18 (the gas forming the recirculating gas current 20 and the combustion gas) is partially exhausted. Here, the sensible heat of the exhausted gas is recovered in the regenerative bed 11B. When a predetermined time (for example, not more than 60 seconds, or more preferably approximately 20 seconds, or most preferably not more than 20 seconds) lapses after starting the operation of the burner 3A, the four-way valve 12 is changed over, and one fuel control valve 22A or 22B is closed while the other is opened in association with this changeover action. This supplies the combustion air and the fuel to the burner 3B to start combustion, and the burner 3A stops its operation to enter the standby mode. Here, the combustion air supplied to the burner 3B is preheated by the regenerative bed 11B heated by using the heat of the exhaust gas to have a very high temperature (for example, approximately 800 through 1000° C.).

Usually, when the flow of the recirculating gas current 20 with a high velocity collides with the flame 17, a temperature of the flame is lowered and the flame goes out. However, since a temperature of the recirculating gas current 20 is higher than the self-ignition temperature of the fuel (high temperature close to that of the exhaust gas), the temperature at the ignition point can not be easily lowered, the ignitionability and the stability of flames are improved and the flame can not be blown out.

Thereafter, the burners 3A and 3B alternately operate at predetermined time intervals in synchronism with inversion of the recirculating gas current 20 in the out-of-furnace circulating path 4 and use the combustion air having a very high temperature to repeat alternate combustion, thereby intending carburetion of the recirculating gas current which has been consumed by heating.

At the same time, the gas current flowed out from the inside of the furnace 18 to the heating chamber 2 is partially induced to the out-of-furnace circulating path 4 by a negative pressure generated by the circulating fan 6 and turned into the recirculating gas current 20 after increasing the pressure thereof by the circulating fan 6. It is then injected from the heating chamber 2 to the inside of the furnace 18 at high speed and forms the high-temperature strong recirculating current 10 in the furnace 18. Here, the recirculating gas current 20 passes through the regenerative bed 5B at the gas current outlet/inlet opening 9B of the out-of-furnace circulating path 4 and wastes its sensible heat in the regenerative bed 5B to have a low temperature. The recirculating gas current is further cooled down by the heat removing means 8. The cooled down recirculating gas current is led into the circulating fan 6 where the gas current pressure increases, and passes through the regenerative bed 5A on the opposite side to be injected to the inside of the furnace 18. At this time, the recirculating gas current 20 again comes to have a high temperature by direct heat exchange in the regenerative bed 5A (or 5B). The recirculating gas current 20 having a high temperature of approximately 1000° C. or above is, therefore, cooled down to a temperature of 200° C. or below when flowing through the out-of-furnace circulating path 4, and it again comes to have the above-mentioned high temperature when it is returned to the inside of the furnace 18.

The high-temperature strong recirculating gas current 10 can greatly increase its recirculating quantity of the gas current in the furnace 18 in which a plurality of tubes 19 are spread. That is, the gas flow in the furnace 18 forms the strong recirculating current 10 obtained by adding the quantity of the supplied air and fuel with the gas quantity of the recirculating gas current 20, and an increase in quantity of the recirculating gas current intensifies the gas flow in the furnace 18. Also, occurrence of advancement of mixing the gas in the furnace or an increase in quantity of the convection heat transfer eliminates a difference in temperature of the gas current everywhere in the furnace to smooth the temperature distribution. Moreover, when the gas recirculating ratio becomes large, an increase in the heat capacity of the combustion gas enlarges the quantity of heat transfer. In other words, since the velocity of the gas current controls the heat transfer in the convection heat transfer, an increase in quantity of the recirculating gas current greatly improves the heat transfer efficiency. Moreover, the periodical inversion of a direction of the strong recirculating gas current 10 causes the temperature in the furnace (although the temperature in the furnace is an ambient temperature formed by the gas current temperature and the furnace wall temperature, the gas current temperature is mainly dominant in case of the gas current type boiler) to be further made uniform, thus eliminating unevenness of heating. In addition, although the maximum temperature in the furnace is lowered in inverse proportion to an increase in the gas recirculation ratio, the average temperature in the furnace merely shows reduction and the maximum temperature in the furnace approximates to the average temperature in the furnace, thus averaging the temperature distribution in the furnace.

Therefore, according to the gas recirculating boiler of this embodiment, since the gas current temperature can be increased to an allowable heat flux of the tube 19, reduction in the heat transfer area can decrease the size of the furnace or heating process time. Additionally, the temperature increase caused by combustion due to carburetion of the recirculating gas current can be suppressed to 300 through 500° C., thereby reducing the quantity of combustion.

Although the above has described one of preferred embodiments, the present invention is not restricted thereto, and various modifications and other embodiments are possible within the true scope and spirit of the invention. For example, in the foregoing embodiment, the description has been mainly given as to the example where the invention is applied to the boiler, but the invention is not restricted thereto and can be applied to any other heating equipment such as a tubular heating furnace, a superheater, a hydrogen reformer and others as long as it is a heating equipment which is provided with a group of tubes in the furnace and flows a heating target therethrough in order to heat the target by convection heat transfer using the gas current.

Further, although the regenerative burner system for alternately burning a pair of burners 3A and 3B having the regenerative beds 11A and 11B is used as a heat source in the above embodiment, the present invention is not restricted to this system. As a heat source, an electric heater, a radiant tube burner, an oxygen combustion burner and any other burner can be used, for example. Here, in case of the heat source such as an electric heater or a radiant burner which can not be changed over in a short time of several tens seconds, the heat source of the both heating chambers 2 is constantly maintained to be ON. In this case, the generated heat is recovered in the regenerative beds 5A and 5B of the out-of-furnace circulating path 4 and used for heating the recirculating gas current, whereby the heat is not wasted. In addition, according to the present invention, since a flame is formed in the heating chambers 2 apart from the inside of the furnace and combustion is completed in the combustion chamber 2, the available fuel is not limited to the fuel gas and the liquid fuel can be also used.

Figure 3:
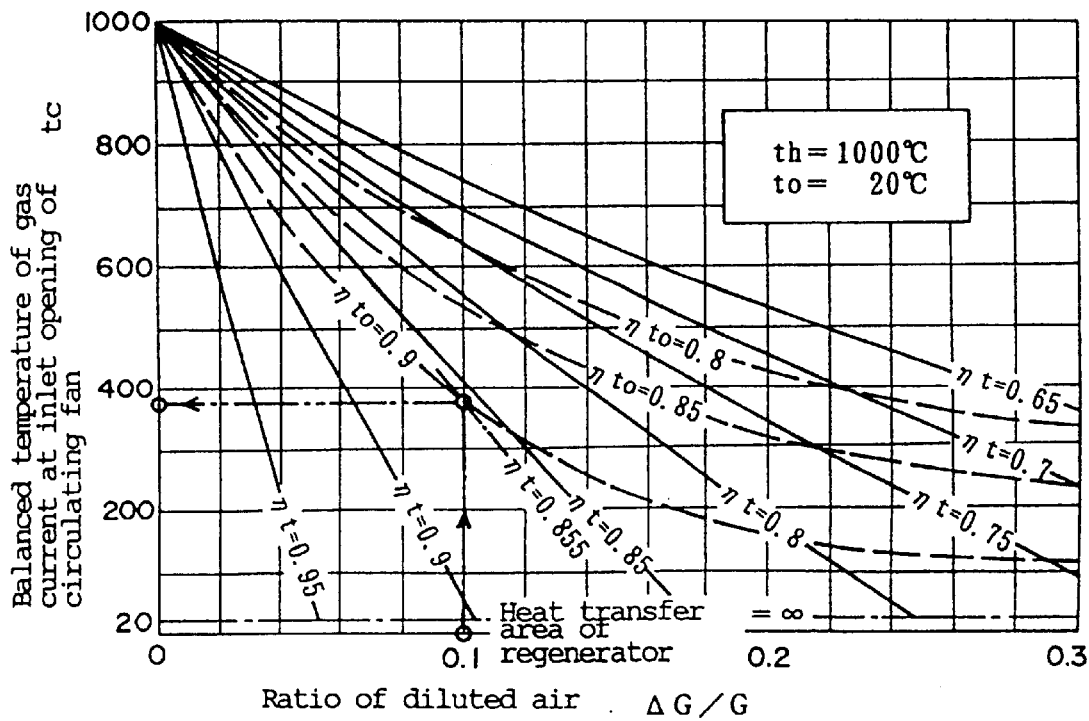
FIG. 3 is a graph showing the relationship between the balanced temperature of a gas current at the intake opening of the circulating fan and a ratio of the diluted air in connection with the relationship with the temperature efficiency of the regenerative bed.
Figure 4:
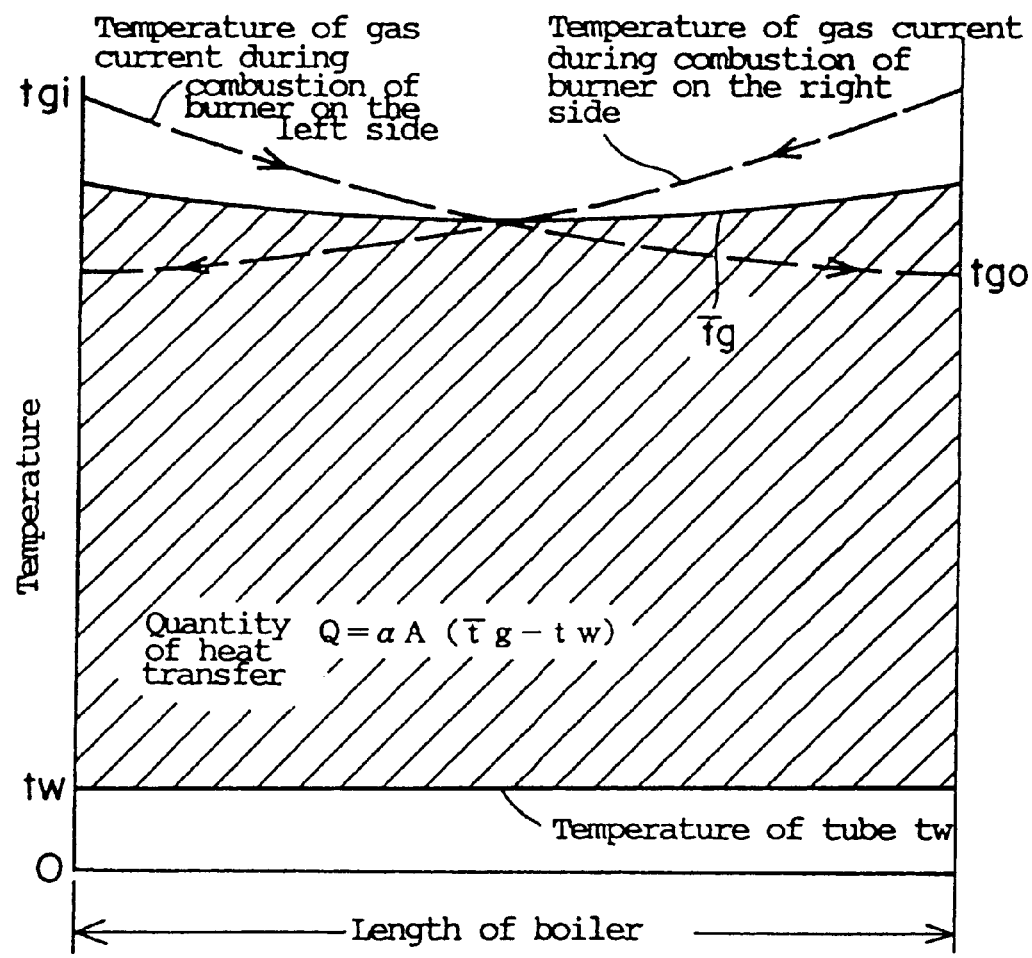
FIG. 4 is a view showing a temperature distribution in the furnace, used for explaining heat transfer of the gas recirculating tubular boiler according to the present invention.
Figure 5:
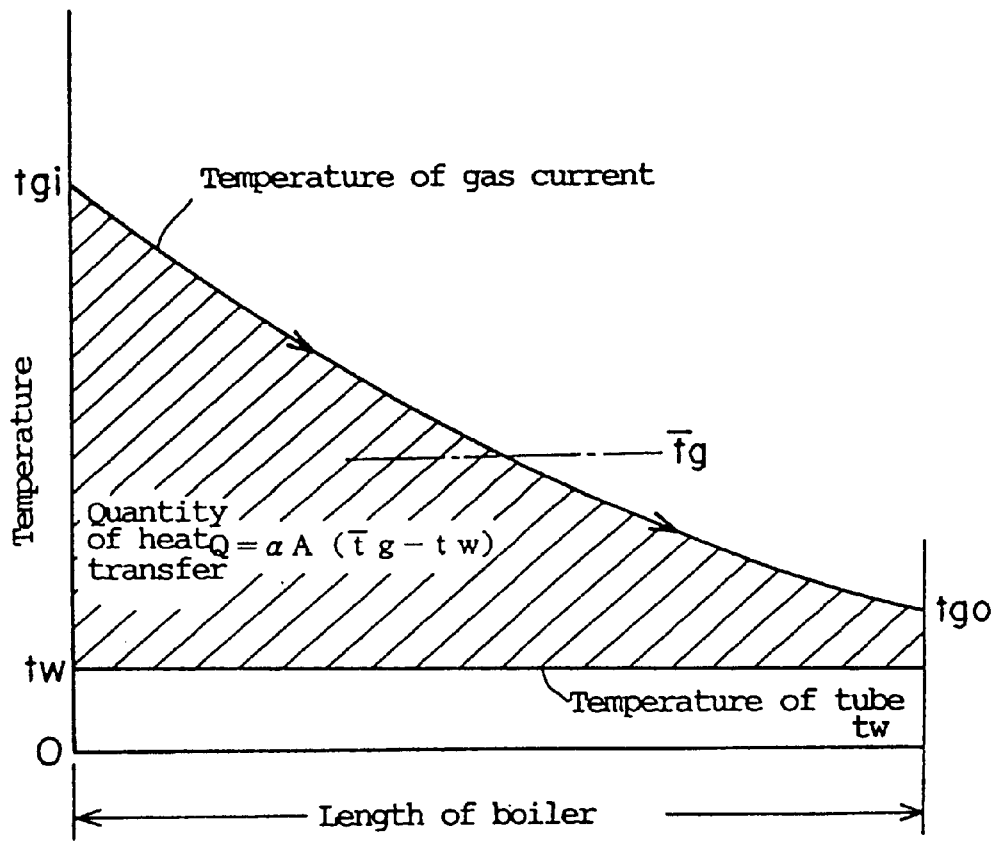
FIG. 5 is a view showing a temperature distribution in a furnace according to a prior art gas recirculating type boiler.
Figure 6:
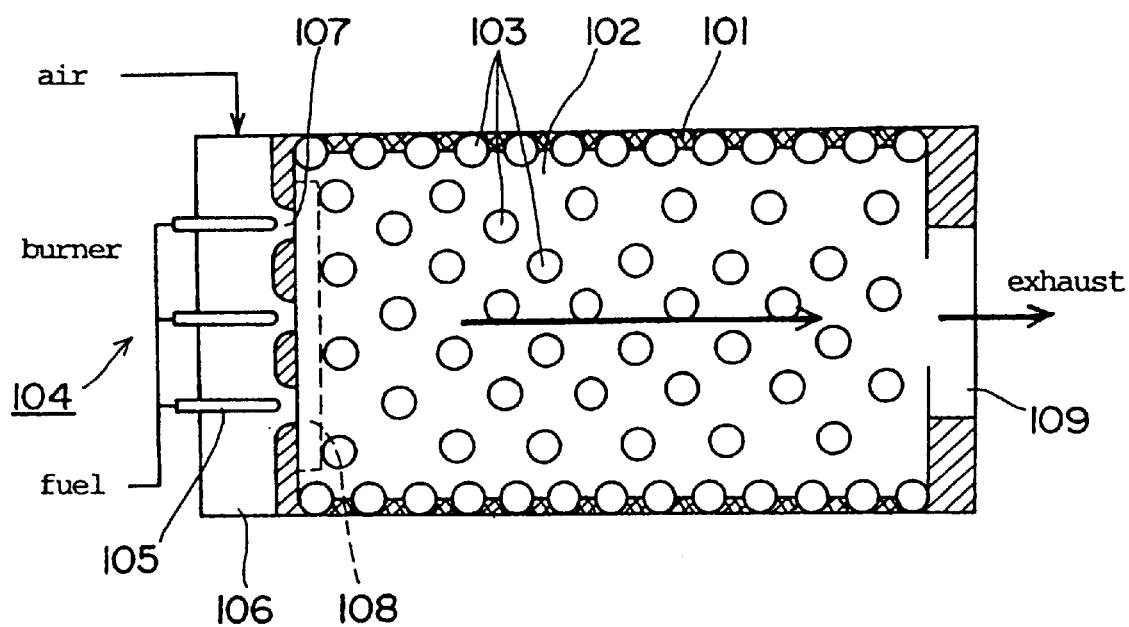
FIG. 6 is a principle view showing an example of a prior art gas recirculating type boiler.

The heat removing means 8 is not restricted to the preheater for preheating a heating target such as boiler water or petroleum. Although not shown, a means for directly taking out the heat by injecting air having an ordinary temperature to the recirculating gas current 20 may be adopted, for example. In this case, the relationship shown in the above expression 2 and FIG. 3 is established by changing the state of the recirculating gas current 20 by heat exchange.

Further, although not shown, the heat removing means 8 can be also constituted by reducing the heat insulating efficiency of the passage between the both regenerative beds 5A and 5B in the vicinity of the recirculating gas current inlet/outlet openings 9A and 9B of the out-of-furnace circulating path 4, e.g., by reducing the thickness of a heat insulating material or using an inexpensive heat insulating material having the poor heat insulating property. In such a case, although the heat utilizing efficiency is lowered, a quantity of a heat insulating material used in the facility can be reduced or use of an inexpensive heat insulating material can lead to a reduction in the facility cost.

I claim:

1. A gas recirculating tubular heating equipment for passing a high-temperature gas current through a furnace having a group of tubes for passing a heating target fluid therethrough in order to heat the heating target flowing through the tubes, the gas recirculating tubular heating equipment comprising: heating chambers provided on both sides of the furnace and having a heat source for heating a gas current which is yet to be injected into the furnace; and an out-of-furnace circulating path for connecting the heating chambers with each other to take out a recirculating gas current in the furnace to the outside of the furnace so that the recirculating gas current be flowed back into the furnace, the out-of-furnace circulating path including regenerative beds provided in the vicinity of recirculating gas current inlet/outlet openings of the heating chambers, a circulating fan, a passage switching device for selectively and alternately connecting an intake opening and an outlet opening of the circulating fan to one of the regenerative beds in order to switch a direction of the gas current to the regenerative beds, and a heat removing means for performing heat removal or dilution in order to change the gaseity of the recirculating gas current in a section between the both regenerative beds, thereby periodically inverting a direction of the gas current by cyclic changeover of the passage switching device to form a high-temperature strong recirculating current which periodically inverts its direction in the furnace.

2. The gas recirculating tubular heating equipment according to claim 1, wherein the heat source is a regenerative burner system which is provided with regenerative beds and alternately burns a pair of burners which supply combustion air or exhaust the recirculating gas current through the regenerative beds.

3. The gas recirculating tubular heating equipment according to claim 1 or 2, wherein the heat removing means is provided between the passage switching device and an intake side of the circulating fan.

4. The gas recirculating tubular heating equipment according to claim 1 or 2, the heat removing means serves to inject a small quantity of gas.

5. The gas recirculating tubular heating equipment according to claim 1 or 2, wherein the heat removing means is a preheater for preheating the heating target and removes heat of the recirculating gas current by preheating the heating target.

6. The gas recirculating tubular heating equipment according to claim 1 or 2, wherein the heat removing means is constituted by reducing the heat insulating effect of a passage between the regenerative beds of the out-of-furnace circulating path.

* * * * *